US010296020B2

(12) United States Patent
Tondolo

(10) Patent No.: US 10,296,020 B2
(45) Date of Patent: May 21, 2019

(54) BOOSTER VALVE FOR PNEUMATIC CIRCUITS

(71) Applicant: Flavio Tondolo, Stezzano (IT)

(72) Inventor: Flavio Tondolo, Stezzano (IT)

(73) Assignee: STI S.R.L., Gorle (BG) (IT)

( * ) Notice: Subject to any disclaimer, the term of this patent is extended or adjusted under 35 U.S.C. 154(b) by 375 days.

(21) Appl. No.: 15/032,990

(22) PCT Filed: Nov. 5, 2013

(86) PCT No.: PCT/IT2013/000305
§ 371 (c)(1),
(2) Date: Apr. 28, 2016

(87) PCT Pub. No.: WO2015/068179
PCT Pub. Date: May 14, 2015

(65) Prior Publication Data
US 2016/0349768 A1    Dec. 1, 2016

(51) Int. Cl.
F15B 13/042    (2006.01)
G05D 16/18    (2006.01)
F16K 31/363    (2006.01)

(52) U.S. Cl.
CPC .......... G05D 16/18 (2013.01); F16K 31/363 (2013.01); G05D 16/187 (2019.01)

(58) Field of Classification Search
CPC . F16K 31/1221; F16K 31/1223; F15B 13/042
(Continued)

(56) References Cited

U.S. PATENT DOCUMENTS 5,170,693 A * 12/1992 Stary ............... F15B 15/068
                                                251/63.4
5,638,860 A *  6/1997 DeRoche ........... F16K 47/00
                                                137/493.8
(Continued)

FOREIGN PATENT DOCUMENTS

EP        2236840        10/2010

Primary Examiner — Marina A Tietjen
Assistant Examiner — Paul J Gray
(74) Attorney, Agent, or Firm — R. Ruschena Patent Agent, LLC

(57) ABSTRACT

Booster valve (4) for pneumatic circuits, comprising: a hollow body (5), a pilot flow inlet/outlet gap (15) communicating directly with a control volume (16), an inlet/outlet gap (45) communicating with an actuator and communicating directly with an accumulation volume (29), a supplying gap (53) communicating directly with a supplying volume (38), a discharge gap (44), an amplified discharge shutter (25) which determines the sealing towards the discharge gap (44), a central device (43) comprising an amplified charge shutter (32) which determines the sealing towards the supplying gap (53), an activation piston (22) which, subjected to the pressure acting in the accumulation volume (29) and in the control volume (16), determines the movement of the amplified discharge shutter (25) or the amplified charge shutter, and having two separated and independent charge (47) and discharge (46); gain control devices which allow an independent adjustment between the charge and the discharge step and vice versa, and the central device (43) comprising a plurality of stakes (33), which, in combination with the passage sections determined by the opening of the amplified discharge shutter (25) and the amplified charge shutter (32) determine the flow amplification in discharge and charge steps.

10 Claims, 4 Drawing Sheets

(58) Field of Classification Search
USPC .......................................... 137/596.18, 596.2
See application file for complete search history.

(56) References Cited

U.S. PATENT DOCUMENTS

2010/0243929 A1\* 9/2010 Tondolo ................ F15B 13/042
                                                                        251/62
2012/0085437 A1    4/2012 Lovell \* cited by examiner

BOOSTER VALVE FOR PNEUMATIC CIRCUITS

BACKGROUND OF THE INVENTION

1. Field of the Invention

The present invention generally relates to fluid flow control devices, and more in particular to a pneumatic booster valve.

2. Brief Description of the Prior Art

Continuous process industry, such for example the chemical, pharmaceutical and food industry, usually need to maintain and adjust the parameter values of the same process by means of pressure control. Therefore, there are used suitable manual or electric electro-pneumatic interfaces and pressure controllers.

A manual pressure controller is a device, in which a pressure signal is provided by a handle control.

Such controllers supply an outlet pressure favoring precision instead of dynamic behavior.

Anyway, the obtainable precision has limitations due to mechanical problems caused by spring stiffness variations or caused by friction, and for this reason, there are also provided electric controllers which improve precision performance.

The pressure transmitters and the pressure controllers are generally provided such that they produce a limited flow rate pressure signal, and when there are needed high flow rates it is needed to use suitable flow booster valves (or simply booster valves), characterized in that they can be controlled by a variable pressure, providing an outlet proportional pressure with high flow rates and equal to the control pressure. There exist also valves able to modify the ratio between these pressures by a constant value. Generally, a flow booster valve allows that the user chambers, normally a servo control, are rapidly filled, and that the excess air is discharged slowly from the outlet pipe. The actuation pneumatic systems of the valves comprise, generally, a compressed air source as working fluid, normally provided by an air compressor, which flows through a series of pipes. The compressed air flows into a positioner. The positioner, applied to an actuator, acquires a signal (for example an electric signal) proportional to the value of the position to be controlled (the position of the actuator determines the opening level of a valve shutter etc.). On the basis of the received input, the positioner controls the air flows to the actuator chambers determining the movements of the same actuator. The actuator is the device generating the desired movement.

With the provision of actuators that manage great air volumes, the positioner, by itself, can supply and discharge a sufficient volume of compressed air during an excessively long time interval. As a consequence, such pneumatic circuits, having actuators with great volumes, can be unable to reach the piston suitable speeds. In this cases, between positioner and actuator there are generally provided booster valves. The booster valves allow the actuation system to reduce the working times increasing the air flow rate of the positioner in the first end of the cylinder and at the same time to deplete the air flow in the second end of the cylinder or vice versa. In the known booster valves this flow coefficient (CV) is equal to 1-10 GPM/psi.

However, the advantages of the actuation system obtained by means of the addition of the booster valves are usually accompanied by a reduction in performance in the pneumatic circuit of the actuation system. In particular, the increase in the active elements number of the pneumatic circuit usually implies a dynamic instability of the piston positioning. As a consequence, while increasing the active elements number, due to the addition of the booster valves, the total air flow rate compressed by the positioner needed to activate the same elements is greater than the air flow rate of the pneumatic circuits having a lower number of active elements. In order to be activated and deactivated, the booster valves use the differential pressure variations generated by the pilot flow of the positioner. The amplification is activated when such pressure variation exceeds a determined value, thus implying an inevitable delay (phase lag) between positioner and boosters, both in activation and deactivation step. This delay or phase lag causes the dynamic performance reduction since in activation lengthens the time for reaching the desired position, while when this one is reached it can be overstepped owing to the deactivation delay. Therefore, there exists the need to define a new booster valve, which solves the cited problems.

SUMMARY OF THE INVENTION

The present invention reduces or eliminates such performance inefficiency by means of a booster valve having the features described in the appended independent claim.

Other preferred and/or particularly advantageous embodiments of the invention are described according to the features provided in the appended dependent claims.

According to an embodiment of the invention, the booster valve is characterized by inlet and outlet, separated and independent gain control devices. In this way, there is the possibility to control the discharge amplification without "being subjected" to the effect of the same control during the charge step, or vice versa. Moreover, the charge and discharge shutters result totally independent as well, both is static step (not amplified flow) and dynamic step (amplified flow). By suitably selecting preloading and stiffness of the discharge and charge contrast springs it is possible to obtain the dynamic behaviors desired of the charge amplification without influencing the discharge amplification behavior, and vice versa. This does not occur in the known boosters.

Moreover, the above cited booster valve design provides that the sealing power between the discharge shutter and respective seat is independent of the sealing power between charge shutter and respective seat. The sealing powers are determined by the preloading and stiffness of the contrast springs. In the known booster valves, the increase in the contact strength of one of the two seals is detrimental to the sealing power of the other one.

In addition, said booster valve is characterized by an arrangement and a design of the inner organs (actuation piston, charge shutter, discharge shutter) which exemplifies the realization of the same elements and reduces the number of the portions in contact and respective movement between each other. As a consequence, at equal section of the chambers, it is obtained a better dynamic capacity or in other words an increase in the flow coefficient CV, near 20 GPM/psi in the here examined model.

BRIEF DESCRIPTION OF THE DRAWINGS

These and other advantages of the present invention are described in detail in the following by means of the appended figures.

DETAILED DESCRIPTION OF THE PREFERRED EMBODIMENTS

Figure 1A:
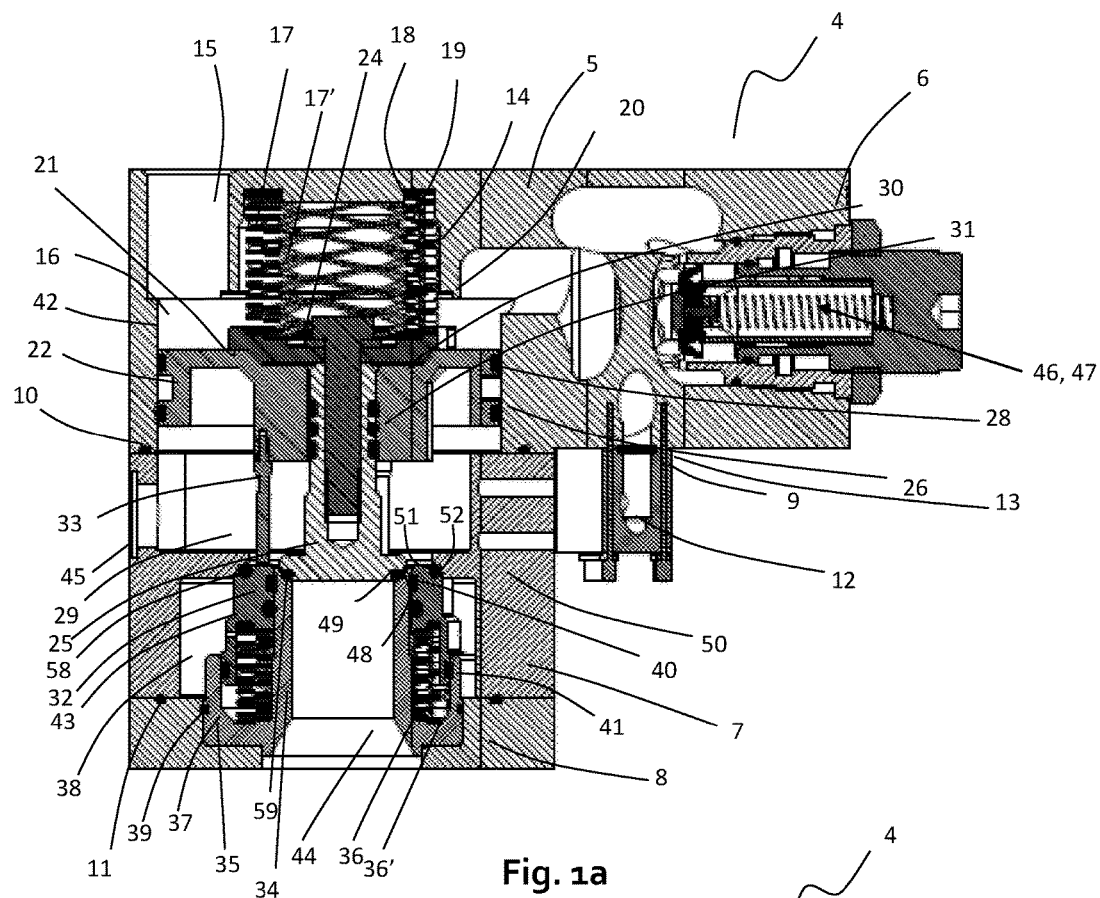
FIG. 1a is a section view of the booster valve during a charge amplification step.
Figure 1B:
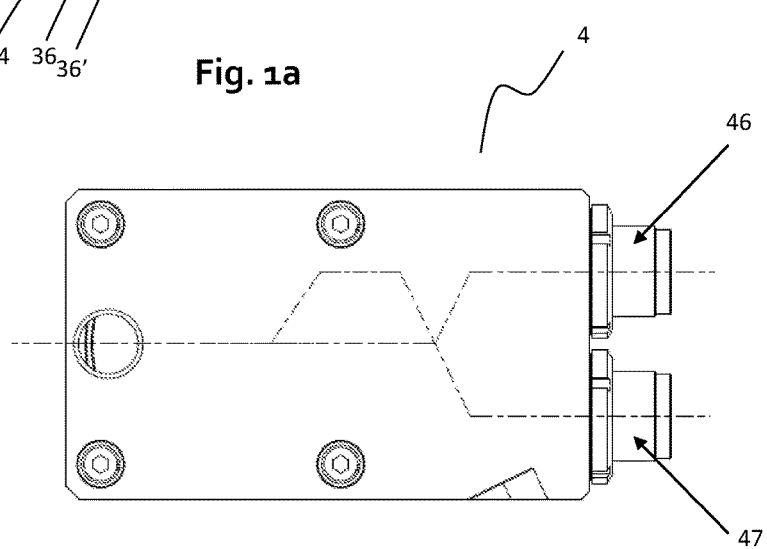
FIG. 1b is a top view (not on scale) of the booster to show the position of the two valves #46 and #47.

As it is shown in FIG. 1, the booster valve 4 comprises a body 5 made up of an upper portion 6, a central portion 7, a lower portion 8 and a side portion 9. Suitable sealing rings 10, 11, 12, 13 guarantee that said portions are sealed between each other.

The body 5 defined by the just cited portions is hollow inside and together with the other elements of the device defines various inner chambers, described in detail in the following.

The upper portion 6 of the body 5 is provided with a pilot flow inlet/outlet gap 15, which is communicating with a control volume 16. The functioning of the control volume 16 is described in detail in the following.

Always inside the upper portion 6 it is defined a cylinder recess 14, seat of two contrast springs 17, 17', arranged concentrically and generally cylindrically configured. Such springs guarantee that the discharge gap is sealed, as it is explained in the following. Inside the upper end of the recess 14 of the portion 6 there are provided two seats 18, 19, parallel between each other, the first seat 18 having with little lower diameter then the second seat 19. The upper end of the two springs 17, 17' strikes on the surface of the seats 18, 19. The lower end of the recess 14, inside the upper portion 6, is characterized by another seat 20 with greater diameter then the one of the two springs 17, 17' and little lower then the diameter of the cap 21, which functions as seat of the second end of the springs 17, 17'.

As it is described in the following, the seat 20 determines a stop surface for the cap 21, when the springs 17, 17' are in the position of maximum compression realizing the end stroke of an amplified discharge shutter 25.

The cap 21 is integral with the amplified discharge shutter 25 by means of a fixed coupling 24. The amplified discharge shutter 25 is positioned partially in the upper portion 6, inside the control volume 16, and in the central position 7, and it is positioned inside an activation piston 22.

The activation piston 22 comprises an outer surface 26 tight coupled (by means of one or more O-ring (28) with an inner surface 42 of the upper portion 6, so that the fluid sealing is guaranteed by the control volume 16 with respect to an accumulation volume 29. Said accumulation volume 29 ends with the gap 45 communicating with the actuator, arranged in the central portion 7 of the body 5. The activation piston 22 slides along the inner surface 42 of the upper portion 6 and at the upper end is provided with a central seat 30. Such central seat 30 makes up the end stroke of the cap 21, configured in the lower end as well so that it strikes on the activation piston 22 during the down stroke of the amplified discharge shutter 25.

The sealing between amplified discharge shutter 25 and activation piston 22 is guaranteed by the provision of O-rings 31 arranged in parallel between each other. The amplified discharge shutter 25 is not stiffly fixed to the activation piston 22 but it slides therein.

The activation piston 22, in its lower end, is integral with an amplified charge shutter 32 by means of three stakes 33 mutually arranged at 120°. The activation piston 22 and the three stakes 33 are integral with the amplified charge shutter 32 and make up a central device 43. The functioning of the central device 43 is described in detail in the following.

The amplified charge shutter 32 is positioned outside an amplified discharge sealing seat 34 which is extended radially in a flange element 35. The amplified discharge sealing seat 34 and the flange 35 make up a plug 37 as a whole, integral with the portion 8 of the body 5 (an O-ring 39 guaranteeing its sealing) and arranged in the lower end of a supplying volume 38 of the air in pressure. The plug 37 is provided with a discharge gap 44.

Figure 2:
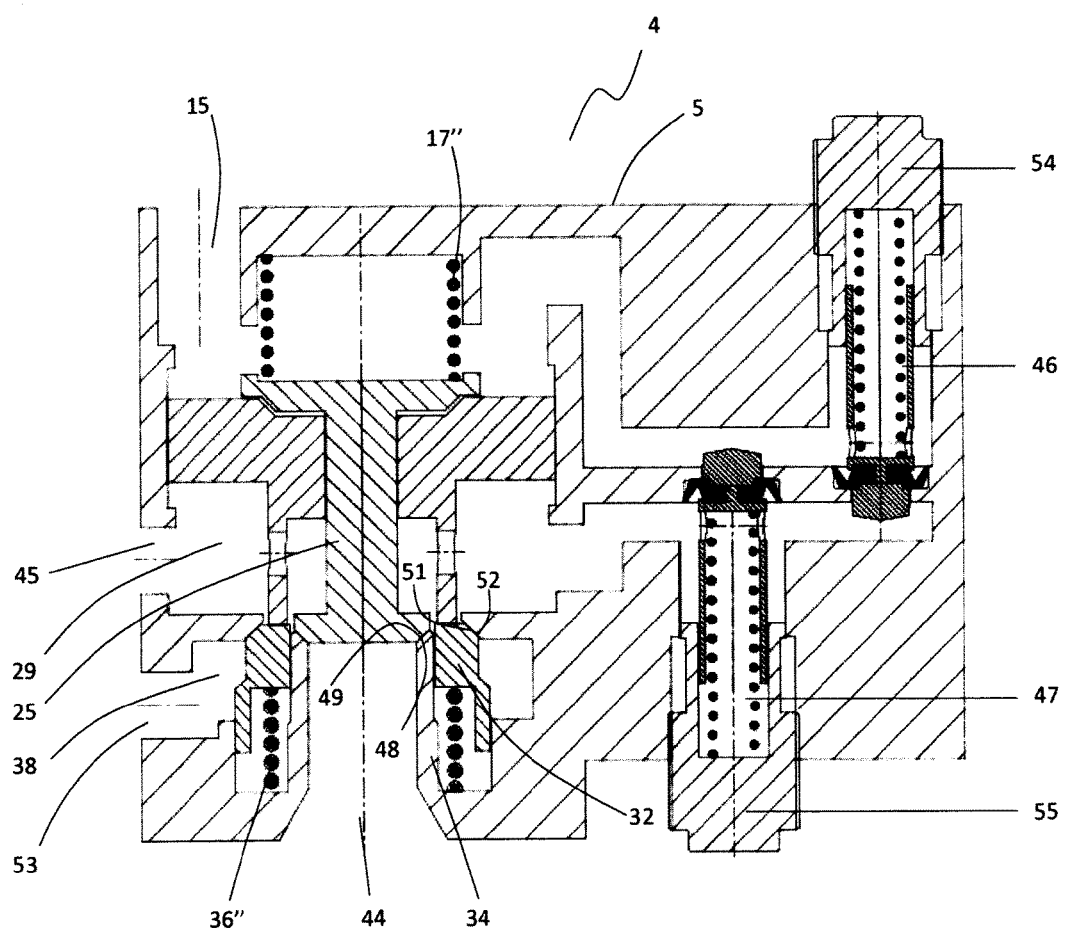
FIG. 2 is a functioning diagram (schematic view of the booster valve assembly of FIG. 1a), which shows the flow amplification in a total rest step.

The amplified charge shutter 32 is not stiffly fixed to the amplified discharge sealing seat 34 of the plug 37, but it can be positioned in sliding way. Between these two elements there are positioned two contrast springs 36, 26', with sealing function towards a supplying gap 53, as shown in FIG. 2.

The sealing between amplified charge shutter 32 and the amplified discharge sealing seat 34 of the plug 37 is guaranteed by the provision of O-rings 40, arranged in parallel between each other. In the same way and for the same aim, between the amplified charge shutter 32 and the flange element 35 of the plug 37 there are suitable O-rings 41.

The amplified charge shutter 32 striking on a sealing wall 50 of the central portion 7 defines a frustum conical sealing surface 51 in engagement with the frustum conical sealing surface 52 of the sealing wall 50. Such sealing is guaranteed by the provision of a suitable gasket 58.

The amplified discharge shutter 25 at the end stroke on the lower end with the amplified discharge sealing seat 34 of the plug 37 defines a frustum conical sealing surface 48 in engagement with the frustum conical sealing surface 49 of the amplified discharge sealing seat 34. Such sealing is guaranteed by the provision of a suitable gasket 59.

As it is shown in FIG. 2, in addition to the above described elements, the booster valve 4 comprises two gain control devices, respectively discharge 46 and charge 47 ones, coupled with the relative discharge 54 and charge 55 gain control screws. The use of the gain control devices 46, 47 is described in detail in the following.

FIG. 2 shows the booster valve 4 in its neutral position, in which the pilot flow is null. The fluid volume connected to the inlet/outlet gap 15 of the pilot flow has the same fluid volume pressure connected to the inlet/outlet gap 45 communicating with the actuator.

When the booster valve 4 is in its neutral position, the contrast springs 17, 17' (represented schematically in figure by only one spring 17") bring the amplified discharge shutter 25 at end stroke, avoiding the fluid passage between the frustum conical surface 48 of the amplified discharge shutter 25, and the frustum conical surface 49 of the amplified discharge sealing seat 34; therefore the accumulation volume 29 remains isolated from the discharge gap 44.

When the booster valve 4 is in its neutral position, the compression springs 36, 36' (represented schematically in figure by only one spring 36") bring the amplified charge shutter 32 at end stroke, avoiding the fluid passage between the frustum conical surface 51 of the amplified charge shutter 32 and the frustum conical sealing surface 52 of the sealing wall 50: therefore the accumulation volume 29 remains isolated from the supplying volume 38.

So, in such a configuration, the device maintains both the supplying gap 53 and the discharge one 44 closed.

Figure 5:
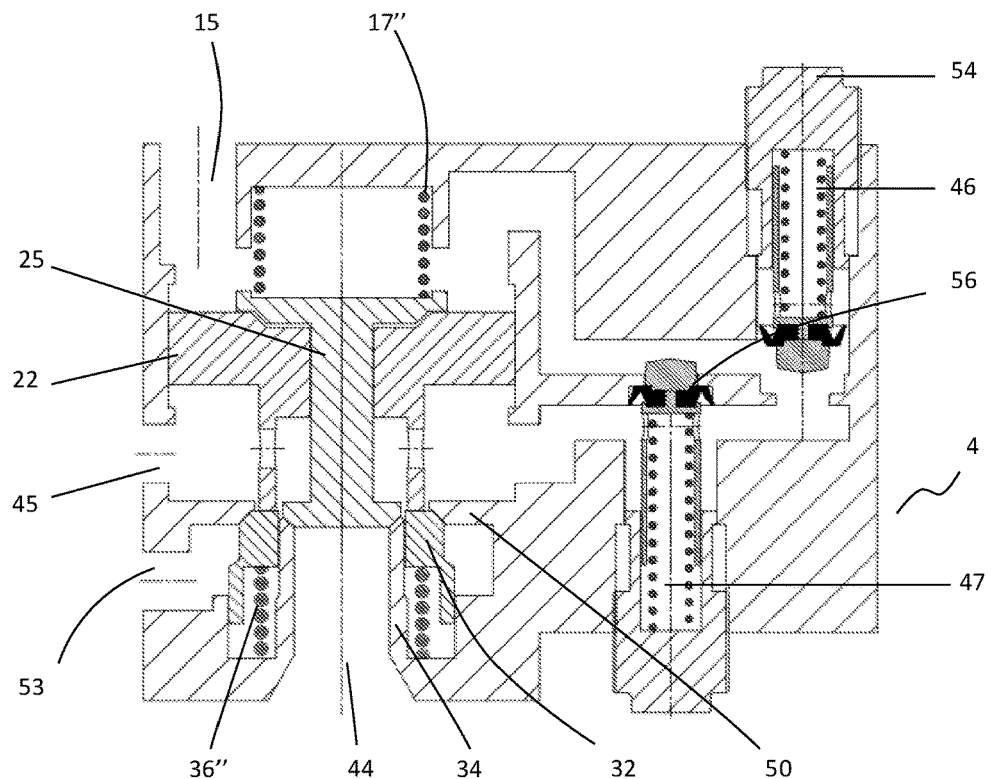
FIG. 5 is a functioning diagram (schematic view of the booster valve of FIG. 1a, which shows the booster valve during a not amplified discharge step.

FIG. 5 shows the booster valve 4 during the not amplified discharge step wherein the pilot flow is in discharge. The flow passes through the discharge gain control device 46, suitably controlled by the discharge gain control screw 54, so that a wide opening is allowed and a light pressure drop is generated. This implies a light upstream and downstream pressure difference of the discharge gain control device 46. In particular the fluid volume connected to the gap 15 of the pilot flow has a little lower pressure with respect to the fluid volume connected to the gap 45 and communicating to the actuator (the charge gain control device 47 remains instead in contact with the respective seat 56 since the generated pressure difference tends to maintain it in the closing position).

After the generated pressure difference, the activation piston 22 exerts a light pressure on the amplified discharge shutter 25, which is not sufficient to win the resistance of the discharge contrast springs 17, 17'.

Therefore, the amplified discharge shutter 25 does not free the discharge gap 44. Both the contrast springs 17, 17' and 36, 36' (represented by only one spring 17" and 36" in FIGS. 2-6) maintain the amplified discharge and amplified charge shutters 25 and 32 in contact with the respective sealing seats, i.e. with the sealing wall 50 and the discharge sealing seat 34, maintaining both the supplying gap 53 and the discharge one 44 closed.

Figure 3:
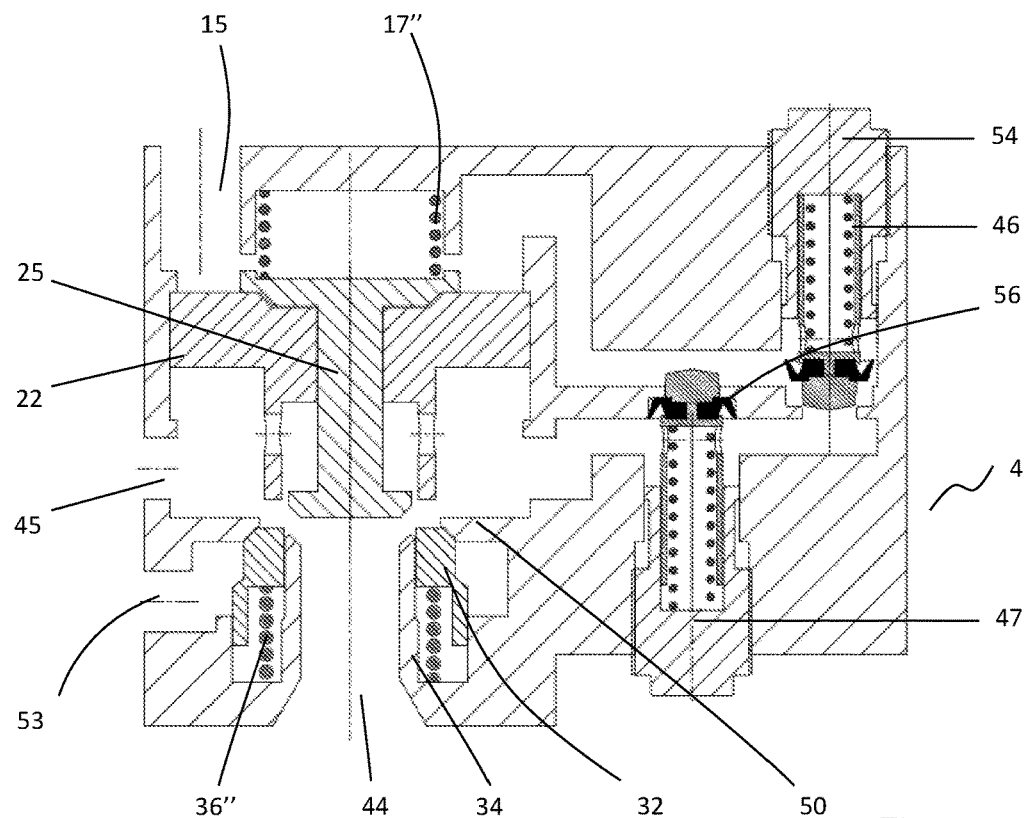
FIG. 3 is a functioning diagram (schematic view of the booster valve assembly of FIG. 1a), which shows the booster valve during a discharge amplification step.

FIG. 3 shows the booster valve 4 during the amplified discharge step, in which the pilot flow is in discharge. The flow passes through the discharge gain control device 46, suitably controlled by the discharge gain control screw 54, so that a partial opening is guaranteed and a relevant pressure drop is generated. Such pressure drop depends on the pilot flow rate and on the adjustment of the same control screw 54. This implies a not negligible upstream and downstream pressure difference of the discharge gain control device 46. In particular, the fluid volume connected to the pilot flow gap 15 has a definitely lower pressure with respect to the fluid volume connected to the gap 45 and communicating with the actuator (the charge gain control device 47 remains instead in contact with the relative seat 56 since the generated pressure difference tends to maintain it in the closing position).

After the generated pressure difference, the activation piston 22 exerts a pressure on the amplified discharge shutter 25 such that the resistance of the contrast springs 17, 17' is won, which are then compressed until reaching the balance condition. The movement of the amplified discharge shutter 25 depends on the pressure exerted by the activation piston 22 and the discharge contrast springs 17, 17'.

Therefore, the amplified discharge shutter 25 goes away from the respective sealing seat 34, thus freeing the discharge gap 44 and causing the amplified discharge. The contrast springs 36, 36' maintain the amplified charge shutter 32 in contact with the sealing wall 50 maintaining the supplying gap 53 closed.

Figure 6:
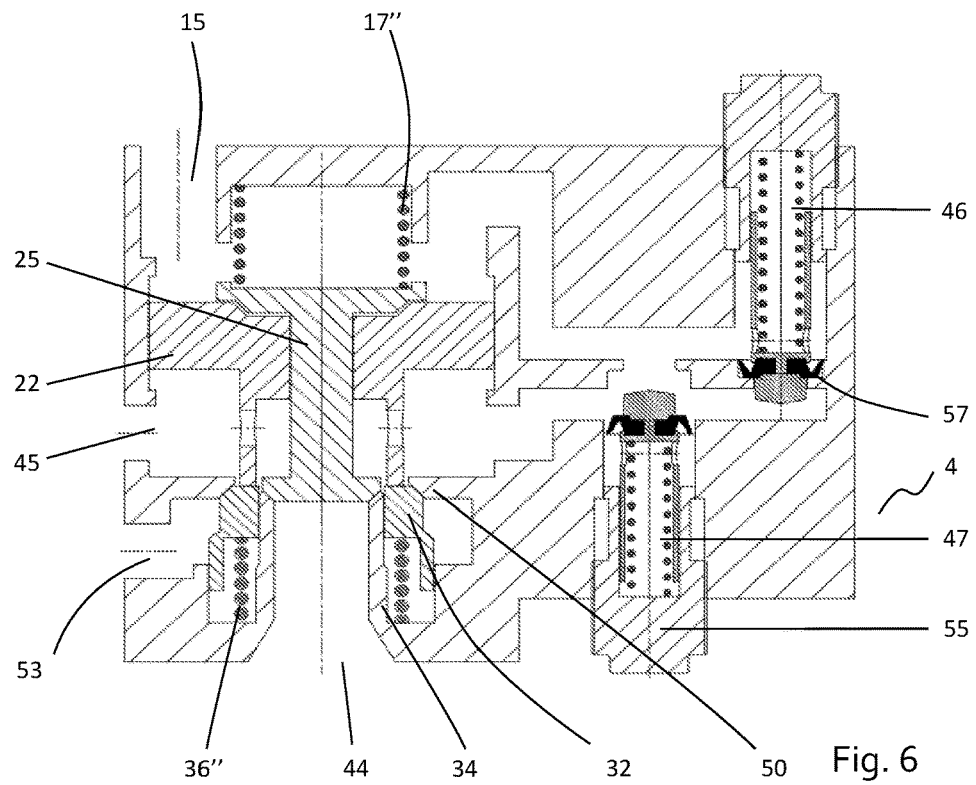
FIG. 6 is a functioning diagram (schematic view of the booster valve of FIG. 1a, which shows the booster valve during a not amplified charge step.

FIG. 6 shows the booster valve 4 during the not amplified charge step, in which the pilot flow is in charge. The flow passes through the charge gain control device 47, suitably controlled by the charge gain control screw 55, so that a wide opening is guaranteed and a light pressure drop is generated. This implies a light upstream and downstream pressure difference of the charge gain control device 47. In particular, the fluid volume connected to the pilot flow gap 15 has a little higher pressure with respect to the fluid volume connected to the gap 45 and communicating with the actuator (the discharge gain control device 46 remains instead in contact with the relative seat 57 since the generated pressure difference tends to maintain it in the closing position). After the generated pressure difference, the activation piston 22 exerts a light pressure on the amplified charge shutter 32, which is not sufficient to win the resistance of the contrast springs 36, 36'. Therefore, the amplified charge shutter 32 does not free the supplying gap 53. Both the contrast springs 17, IT and 36, 36' maintain the amplified discharge and amplified charge shutters 25 and 32 in contact with the respective sealing seats, i.e. with the sealing wall 50 and the discharge sealing seat 34, maintaining both the supplying gap 53 and the discharge one 44 closed.

Figure 4:
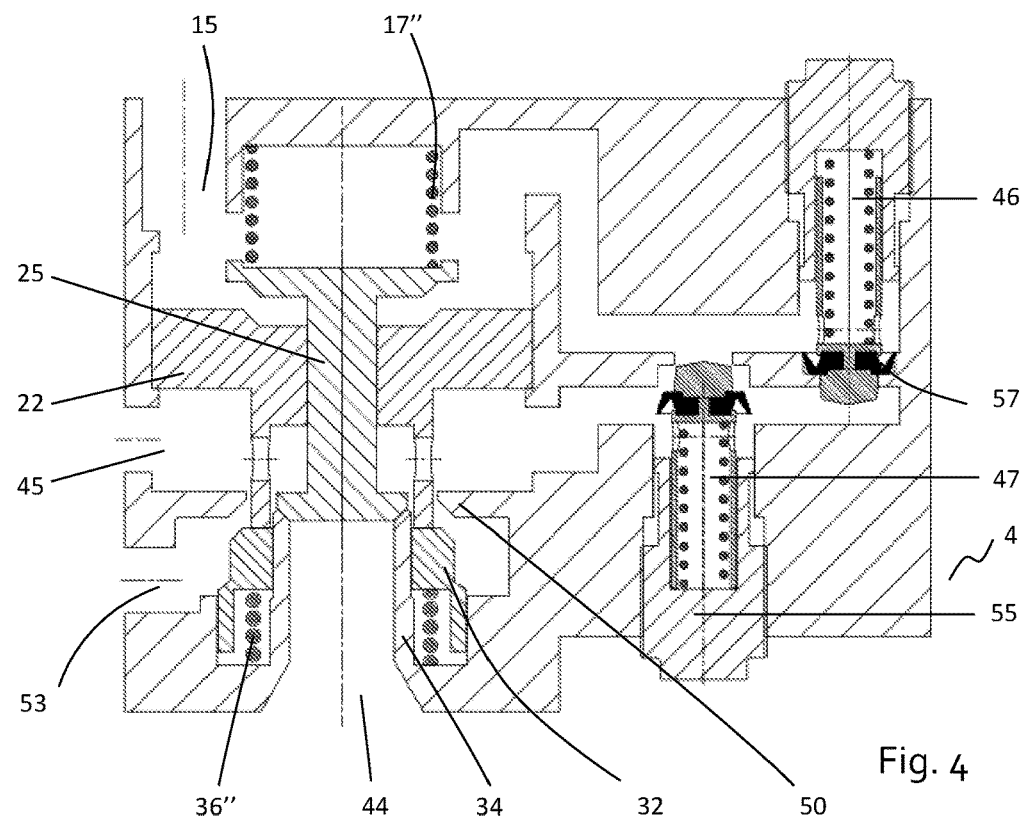
FIG. 4 is a functioning diagram (schematic view of the booster valve of FIG. 1a), which shows the booster valve during a charge amplification step.

FIG. 4 shows the booster valve 4 during the amplified charge step, in which the pilot flow is in charge. The flow passes through the charge gain control device 47, suitably controlled by the charge control screw 55, so that a partial opening is guaranteed and a relevant pressure drop is generated. Such pressure drop depends on the pilot flow rate and on the adjustment of the same control screw 55. This implies a not negligible upstream and downstream pressure difference of the charge gain control device 47. In particular, the fluid volume connected to the pilot flow gap 15 has a definitely higher pressure with respect to the fluid volume connected to the gap 45 and communicating with the actuator (the discharge gain control device 46 remains instead in contact with the relative seat 57 since the generated pressure difference tends to maintain it in the closing position).

After the generated pressure difference, the activation piston 22 exerts a pressure on the amplified charge shutter 32 such that the resistance of the contrast springs 36, 36' is won, which are compressed until reaching the balance condition. The movement of the amplified charge shutter 32 depends on the power exerted by the activation piston 22 and by the charge contrast springs 36, 36'.

Therefore, the amplified charge shutter 32 goes away from the sealing wall 50, thus freeing the discharge gap 53 and causing the amplified charge.

The contrast springs 17, 17' maintain the amplified discharge shutter 25 in contact with the sealing wall 34 maintaining the discharging gap 44 closed.

In addition to the above described embodiments of the invention, it is to be intended that there exist many other variants. It is also to be intended that said embodiments are only examples, not limiting the scope of the invention or its applications or configurations. On the contrary, even if the above description offers those skilled in the art at least on example configuration, it is clear that there are many possible variations of the elements described without departing from the scope of the invention as defined in the appended claims literally interpreted and/or according to legal equivalents thereof.

The invention claimed is:
1. A booster valve (4) for pneumatic circuits, comprising:
   a hollow body (5), made up of an upper portion (6), a central portion (7) a lower portion (8) and a side portion (9), wherein each of said portions are sealed between each other by sealing rings (10, 11, 12, 13);
   a pilot flow inlet/outlet gap (15) communicating directly with a control volume (16);

an inlet/outlet gap (45) communicating with an actuator and communicating directly with an accumulation volume (29);

a supplying gap (53) communicating directly with a supplying volume (38), a discharge gap (44), an amplified discharge shutter (25) which determines the sealing towards the discharge gap (44), a central device (43) comprising an amplified charge shutter (32) which determines the sealing towards the supplying gap (53), an activation piston (22) which, subjected to the pressure acting in the accumulation volume (29) and in the control volume (16), determines the movement of the amplified discharge shutter (25) or of the amplified charge shutter (32); and wherein said activation piston (22) slides along an inner surface (42) of the upper portion (6) and is provided with a central seat (30) which defines an end stroke of a cap (21) which strikes on the activation piston (22) during a down stroke of the amplified discharge shutter (25);

and wherein said booster valve (4) further comprises:

two separated and independent charge (47) and discharge (46) gain control devices which allow an independent adjustment between the charge and discharge step and vice versa;

the central device (43) comprising a plurality of stakes (33), mutually arranged at 120 degrees, which, in combination with an opening of the amplified discharge shutter (25) and the amplified charge shutter (32), determine a flow amplification during discharge and charge steps; and wherein said stakes (33) cause said activation piston (22) to be integral with the amplified shutter (32).

2. The booster valve (4) according to claim 1, wherein said independent charge gain control device (47) and discharge gain control device (46) are manually controlled by means of suitable gain control screws, respectively charge gain control screw (55) and discharge gain control screw (54).

3. The booster valve (4) according to claim 1, wherein said amplified discharge shutter (25) determines the sealing towards the discharge gap (44) by means of contrast springs (17, 17'), and wherein said amplified charge shutter (32) determines the sealing towards the supplying gap (53) by means of contrast springs (36, 36'), and said charge shutter (32) is positioned outside an amplified discharge sealing seat (34) which is extended radially in a flange element (35), and wherein said discharge sealing seat (34) and said flange element (35) make up a plug (37) which is integral with the portion (8) of the body (5) and arranged in a lower end of the supplying volume (38) of air pressure;

and wherein said amplified charge shutter (32) is not rigidly attached to the amplified discharge sealing seat (34) of the plug (37), but it can slide on it, and wherein between these two sliding elements there are two contrast springs (36 26'), providing a sealing function towards said supplying gap (53);

and wherein a sealing between amplified charge shutter (32) and the amplified discharge sealing seat (34) of the plug 37 is obtained by o-rings (40);

and wherein a sealing between amplified charge shutter (32) and a flange element (35) of the plug 37 is obtained by an o-ring (41);

and wherein said contrast springs (17, 17") are arranged concentrically and generally cylindrically configured to guarantee that the discharge gap (44) is sealed.

4. The booster valve (4) according to claim 1, wherein a neutral configuration of the booster is achieved in which a pilot flow is null and the control volume (16) and the accumulation volume (29) are at the same pressure and the fluid volume connected to inlet/outlet gap (15) of the pilot flow has the same fluid volume pressure connected to the inlet/outlet gap (45), whenever:

the contrast springs (17, 17') bring the amplified discharge shutter (25) at end stroke, avoiding a fluid passage between the frustum conical surface (48) of the amplified discharge shutter (25), and the frustum conical surface (49) of the amplified discharge sealing seat (34), thus isolating the accumulation volume (29) from the discharge gap (44) which remains closed;

or the contrast springs (36, 36') bring the amplified charge shutter (32) at end stroke, avoiding a fluid passage between the frustum conical surface (51) of the amplified charge shutter (32) and the frustum conical sealing surface (52) of the sealing wall (50), thus isolating the accumulation volume (29) from the supplying gap (53) which remains closed.

5. The booster valve (4) according to claim 1, wherein a not-amplified discharge configuration of the booster is achieved in which a pilot flow is in discharge, whenever:

when the control volume (16) is in discharge step, the flow coming from the accumulation volume (29) and directed to the control volume (16) meets little fluid resistance passing through the discharge gain control device (46), wide open, as controlled by the control screw (54), so that the pressure in the control volume (16) is higher than the pressure in the accumulation volume (29), thus exerting a lower thrust on the activation piston (22) which in turn exerts a light pressure on the amplified discharge shutter (25) such that the pressure of the contrast springs (17, 17') is not won and a communication between the accumulation volume (29) and the discharge gap (44) is not achieved;

and wherein an amplified discharge configuration of the booster is achieved in which a pilot flow is in discharge, whenever:

when the control volume (16) is in discharge step, the flow coming from the accumulation volume (29) and directed to the control volume (16) meets a great fluid resistance passing through the discharge gain control device (46), partially open, as controlled by the control screw (54), so that the pressure in the control volume (16) is lower than the pressure in the accumulation volume (29), thus exerting a greater thrust on the activation piston (22) which in turn exerts a significant pressure on the amplified discharge shutter (25) such that the pressure of the contrast springs (17, 17') is won and a communication between the accumulation volume (29) and the discharge gap (44) is established, causing an amplified discharge.

6. The booster valve (4) according to claim 1, wherein a non-amplified charge configuration of the booster in which a pilot flow is in charge is achieved, whenever:

the control volume (16) is in charge step, the flow coming from the control volume (16) and directed to the accumulation volume (29) meets little fluid resistance crossing the charge gain control device (47), widely open, since controlled by the control screw (55), so that the pressure in the control volume (16) is higher than the pressure in the accumulation volume (29), thus exerting a lower thrust on the activation piston (22) which in turn exerts a light pressure on the amplified charge shutter (32) such that the pressure of the contrast springs (17, 17') is not won and a communication between the supplying gap (53) and the accumulation volume (29) is not achieved;

and wherein an amplified charge configuration of the booster in which a pilot flow is in charge is achieved, whenever:

the control volume (16) is in charge step, the flow coming from the control volume (16) and directed to the accumulation volume (29) meets a fluid resistance crossing the charge gain control device (47), partially open, since controlled by the control screw (55), so that the pressure in the control volume (16) is lower than the pressure in the accumulation volume (29), thus exerting a greater thrust on the activation piston (22) which in turn exerts a strong pressure on the amplified charge shutter (32) such that the pressure of the contrast springs (17, 17') is won and a communication between the supplying gap (53) and the accumulation volume (29) is provided, causing an amplified charge.

7. The booster valve (4) according to claim 1, wherein said amplified charge shutter (32), striking on a sealing wall (50) of the central portion (7), defines a frustum conical sealing surface (51) in engagement with a frustum conical sealing surface (52) of the sealing wall (50), to achieve a sealing using a suitable gasket (58);

and wherein said amplified discharge shutter (25) at an end stroke on a lower end with the amplified discharge sealing seat (34) of the plug (37) defines a frustum conical sealing surface (48) in engagement with a frustum conical sealing surface (49) of the amplified discharge sealing seat (34), to achieve a sealing using a suitable gasket (59).

8. The booster valve (4) according to claim 1, wherein said amplified discharge shutter 25 and activation piston 22 have a sealing between them, provided by O-rings 31 arranged in parallel between each other; and wherein said amplified discharge shutter 25 is not rigidly attached to the activation piston 22 but it slides therein;

and wherein said activation piston 22, in its lower end, is integral with an amplified charge shutter 32 by means of three stakes 33 mutually arranged at 120°. The activation piston 22 and the three stakes 33 are integral with the amplified charge shutter 32 and make up a central device 43.

9. The booster valve (4) according to claim 1, wherein said upper portion (6) defines a cylinder recess (14) to seat two contrast springs (17, 17') arranged concentrically and of cylindrical shape; and wherein inside and upper end of said cylinder recess (14) there are two seats (18,19), parallel of each other, wherein seat (18) diameter is smaller than seat (19) diameter;

and wherein said upper portion (6) further defines a seat (20) of a larger diameter than the one of said two springs (17, 17') and smaller diameter than the cap (21), said seat (2) defines a stop surface for cap (21) when springs (17, 17') are in a position of maximum compression at an end stroke of the amplified discharge shutter (25);

and wherein an upper end of said two springs (17, 17') strikes on the surface of said two seats (18, 19);

and wherein said cap (21) is integral with the amplified discharge shutter (25) by way of a fixed coupling (24).

10. The booster valve (4) according to claim 1, wherein said activation piston (22) comprises an outer surface (26) coupled via an O-ring (28) with an outer surface (42) of the upper portion (6) to insure that the fluid of control volume (16) is separated by the accumulation volume (29) which ends with the inlet/outlet gap (45) of central portion (7) of body (5).

* * * * *